(12) United States Patent
Handy et al.

(10) Patent No.: US 11,005,254 B2
(45) Date of Patent: May 11, 2021

(54) SYSTEM AND METHOD FOR PROTECTING A SOLID-STATE POWER CONTROLLER

(71) Applicant: GE Aviation Systems Limited, Cheltenham (GB)

(72) Inventors: Peter James Handy, Cheltenham (GB); Michael Glenny, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 733 days.

(21) Appl. No.: 15/728,552

(22) Filed: Oct. 10, 2017

(65) Prior Publication Data
US 2018/0145498 A1    May 24, 2018

(30) Foreign Application Priority Data
Nov. 18, 2016  (GB) ...................................... 1619504

(51) Int. Cl.
| | |
|---|---|
| *H02H 3/10* | (2006.01) |
| *H02H 3/08* | (2006.01) |
| *H02H 3/02* | (2006.01) |
| *H02H 1/00* | (2006.01) |
| *H02H 7/22* | (2006.01) |

(Continued)

(52) U.S. Cl.
CPC ............ *H02H 3/10* (2013.01); *H02H 1/0007* (2013.01); *H02H 3/023* (2013.01); *H02H 3/08* (2013.01); *G06F 1/00* (2013.01); *H02H 1/0061* (2013.01); *H02H 5/04* (2013.01); *H02H 7/222* (2013.01); *H02H 9/02* (2013.01)

(58) Field of Classification Search
USPC ................................................ 361/93.1, 93.8
See application file for complete search history.

(56) References Cited

U.S. PATENT DOCUMENTS

| | | | |
|---|---|---|---|
| 4,110,809 A | | 8/1978 | Cronin |
| 4,618,906 A | * | 10/1986 | Paice ..................... H02H 3/023 |
| | | | 361/5 |

(Continued)

FOREIGN PATENT DOCUMENTS

| | | |
|---|---|---|
| EP | 0 148 370 A1 | 7/1985 |
| EP | 2017934 A2 | 1/2009 |

(Continued)

OTHER PUBLICATIONS

Extended European Search Report and Opinion issued in connection with corresponding EP Application No. 17201176.9 dated May 4, 2018.

(Continued)

*Primary Examiner* — Danny Nguyen
(74) *Attorney, Agent, or Firm* — McGarry Bair PC

(57) ABSTRACT

An electrical power distribution system can distribute electricity from a source to a load, and can comprise at least one solid state power controller (SSPC) having an input coupled to the source and an output coupled to the load. The SSPC can include an open shunt switch connecting the input to ground. A control circuit can couple to the shunt switch and can be configured to detect a failure in the SSPC. A fuse can be connected between the source and the input. A failure can be detected in the SSPC and the control circuit can close the shunt switch to cause a short circuit that will blow the fuse and isolate the SSPC from the source.

18 Claims, 6 Drawing Sheets

(51) Int. Cl.
*H02H 9/02* (2006.01)
*H02H 5/04* (2006.01)
*G06F 1/00* (2006.01)

(56) References Cited

U.S. PATENT DOCUMENTS

| | | | |
|---|---|---|---|
| 4,656,365 | A | 4/1987 | Billings |
| 5,698,887 | A | 12/1997 | Kumano et al. |
| 8,320,090 | B2 | 11/2012 | Rozman et al. |
| 8,390,972 | B2 | 3/2013 | Simper et al. |
| 8,704,574 | B2 | 4/2014 | Prabhuk et al. |
| 8,836,338 | B2 | 9/2014 | Tyler et al. |
| 8,861,162 | B2 | 10/2014 | Fuller et al. |
| 9,197,056 | B2 | 11/2015 | Liu et al. |
| 2004/0174648 | A1 | 9/2004 | Frey et al. |
| 2005/0146824 | A1 | 7/2005 | Borrego Bel |
| 2007/0271403 | A1* | 11/2007 | Kojori ............... H02J 1/10 710/302 |
| 2008/0197699 | A1 | 8/2008 | Yu et al. |
| 2009/0021874 | A1* | 1/2009 | Divito ............... H02H 3/023 361/57 |
| 2009/0109590 | A1* | 4/2009 | Girot ............... H03K 17/122 361/93.8 |
| 2011/0222200 | A1 | 9/2011 | Fuller et al. |
| 2013/0329329 | A1 | 12/2013 | Liu et al. |
| 2014/0035359 | A1 | 2/2014 | Graf et al. |
| 2016/0037582 | A1* | 2/2016 | Novikov ............ G01R 31/42 219/481 |

FOREIGN PATENT DOCUMENTS

| | | |
|---|---|---|
| EP | 2 521 152 A1 | 11/2012 |
| GB | 2396982 A | 8/1933 |
| WO | 2007006021 A1 | 1/2007 |

OTHER PUBLICATIONS

Greta Britain Search Report and Exam Report issued in connection with corresponding Great Britain patent application No 1619504.2 dated Apr. 24, 2017.

Chinese Patent Office; First Office Action in Chinese Patent Application No. 201711146027.1; dated Aug. 8, 2019; 9 pages; China.

\* cited by examiner

SYSTEM AND METHOD FOR PROTECTING A SOLID-STATE POWER CONTROLLER

BACKGROUND OF THE INVENTION

An electrical power distribution system can contain one or more distribution units deployed throughout an aircraft or ground-based system for distributing power from a source to a number of loads. One or more solid state power controllers (SSPC) stacked within each distribution unit can be configured to switch off power to the load wiring loading each SSPC, such as when a load current exceeds a trip protection limit of the SSPC for a certain amount of time. A failure in the SSPC, such as when a solid state switch of the SSPC fails in a closed position, can prevent the SSPC from cutting power to the load during an overcurrent event, leading to undesirable results.

One effective solution to the above shortcomings can be to add a secondary switch at an output of the SSPC to cut power to the load when a failure in the SSPC is detected, or when the load experiences an overcurrent event and the SSPC has not responded. However, a catastrophic failure in the SSPC itself can result in malfunction, overheating, or arcing within the SSPC, particularly in the solid state switch, whether or not the secondary switch has cut power to the load, and which can result in damage to other SSPCs or to the entire distribution unit.

Alternatively, the solid state switch in the SSPC could be replaced with an electromechanical switch to avoid the malfunction, overheating, or arcing that could occur in the solid state switch. But this approach would reintroduce the reliability problems and higher costs associated with the electromechanical technologies which preceded the solid state switch.

SUMMARY OF THE INVENTION

In one aspect, there is disclosed a solid state electrical power distribution system that can distribute electricity from a source to a load, and can comprise at least one solid state power controller (SSPC) having an input coupled to the source and an output coupled to the load. The SSPC can include an open shunt switch that connects the input to ground. A control circuit can couple to the shunt switch and can be configured to detect a failure in the SSPC. A fuse can be connected between the source and the input. When a failure is detected in the SSPC, the control circuit can close the shunt switch to cause a short circuit that will blow the fuse and isolate the SSPC from the source.

In another aspect, there is disclosed a method of galvanically isolating an input of at least one solid state power controller (SSPC) from a source in the event of a failure. The failure can occur in a solid state electrical power distribution system distributing electricity from the source to a load of the SSPC. The method can further comprise providing an open shunt switch in the SSPC that connects the input to ground. The method can further comprise continuously checking the SSPC for a failure. The method can further comprise closing the shunt switch causing a short circuit and blowing a fuse connecting the source to the input when a failure is detected.

In yet another aspect, there is disclosed a protection system for at least one solid state power controller (SSPC). The SSPC can have an input adapted to couple to a source of electricity and can have an output adapted to couple to a load. The protection system can include an open shunt switch that can connect the input to ground and a fuse that can connect between the source and the input. A control circuit can be coupled to the shunt switch and can be configured to detect a failure in the SSPC. When a failure is detected in the SSPC, the control circuit can close the shunt switch to cause a short circuit that will blow the fuse and isolate the SSPC from the source

DETAILED DESCRIPTION

Figure 1:
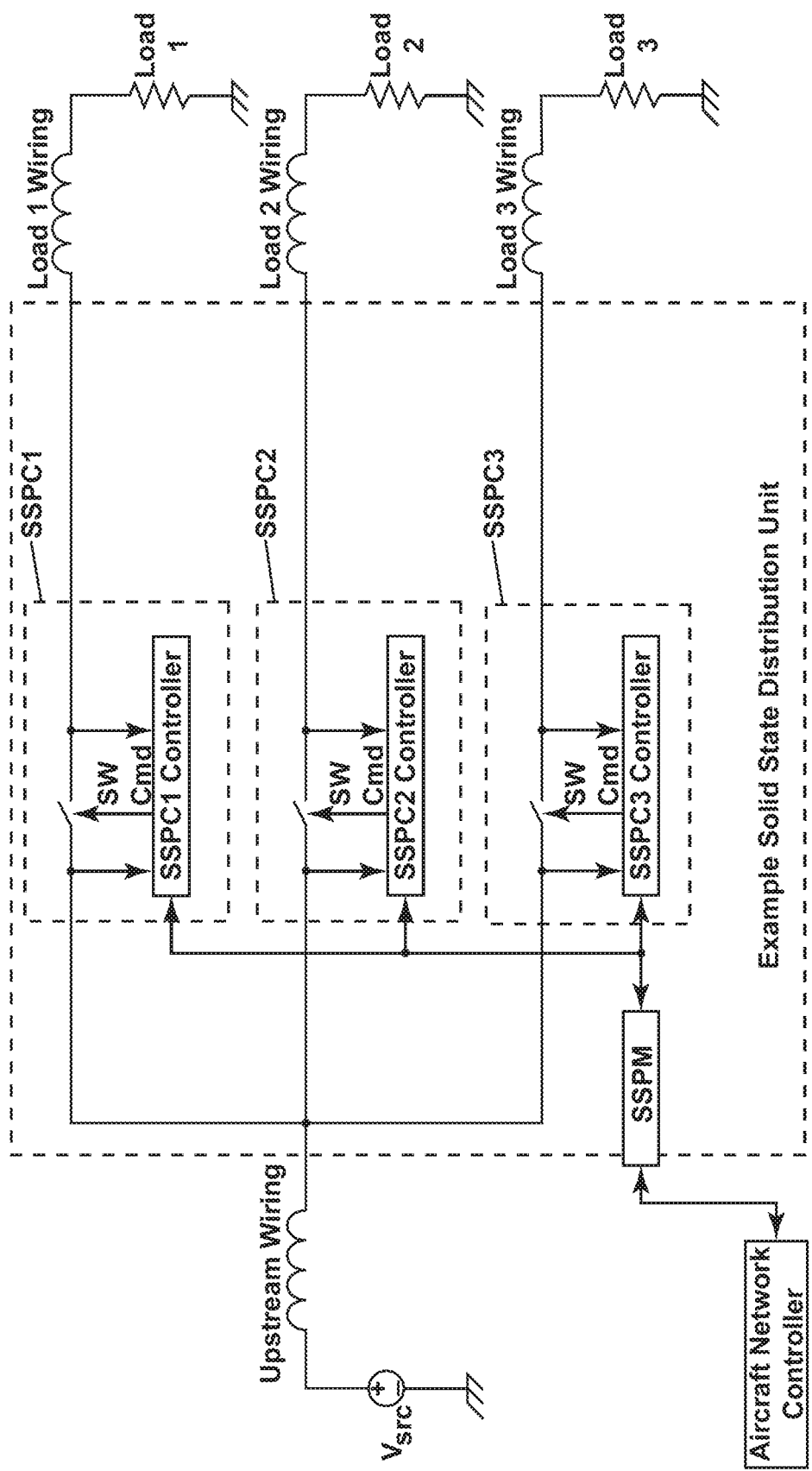
FIG. 1 illustrates a prior art solution providing overcurrent protection to load wiring.

FIG. 1 depicts a prior art solution where a distribution unit can contain three solid state power controllers (SSPC) switching a source through upstream wiring to independent loads each fed by a load wiring. A series switch in each SSPC can be switched open or closed by a switch command from an SSPC control circuit, where each series switch can be a MOSFET or other solid state device. Each SSPC can be remotely controlled from an aircraft network controller. A solid state power management unit (SSPM) can coordinate a centralized control for each distribution unit.

The solid state series switch can have better reliability than an electromechanical circuit breaker by eliminating contact wear and sticking, and by providing customized trip protection to more accurately protect the load and the load wiring. An SSPC load can draw as much as 100 amperes or greater. The SSPC can be designed to provide a trip characteristic following a current-time protection curve that opens the switch when there is a failure in the load wiring or load, or when an overcurrent load condition exists. The SSPC can also be designed to trip instantly at a particular output current condition or when other signal conditions exist such as an irregularity in the input source signal. The SSPC can fail, although infrequently, posing a threat to the safe operation of the SSPC and associated loads. The failure can be catastrophic, meaning there can be damage, overheating, or arcing within the SSPC and particularly within the solid state switching device.

For example, the load can have capacitive or inductive aspects, which can generate high inrush currents or high kickback voltages that can damage the solid state switch. To protect against failure, a soft turn-on can be used to mitigate the inrush currents caused by a capacitive load, and transient suppressors can absorb kickback voltages caused by inductive loads. However, various conditions of source, load, mechanical shock, temperature or extreme capacitive and inductive transients can still cause the solid state switch to fail, leading to a permanently closed condition, arcing, overheating, or other malfunctioning in the SSPC and an inability to cut power to the load wiring.

Figure 2:
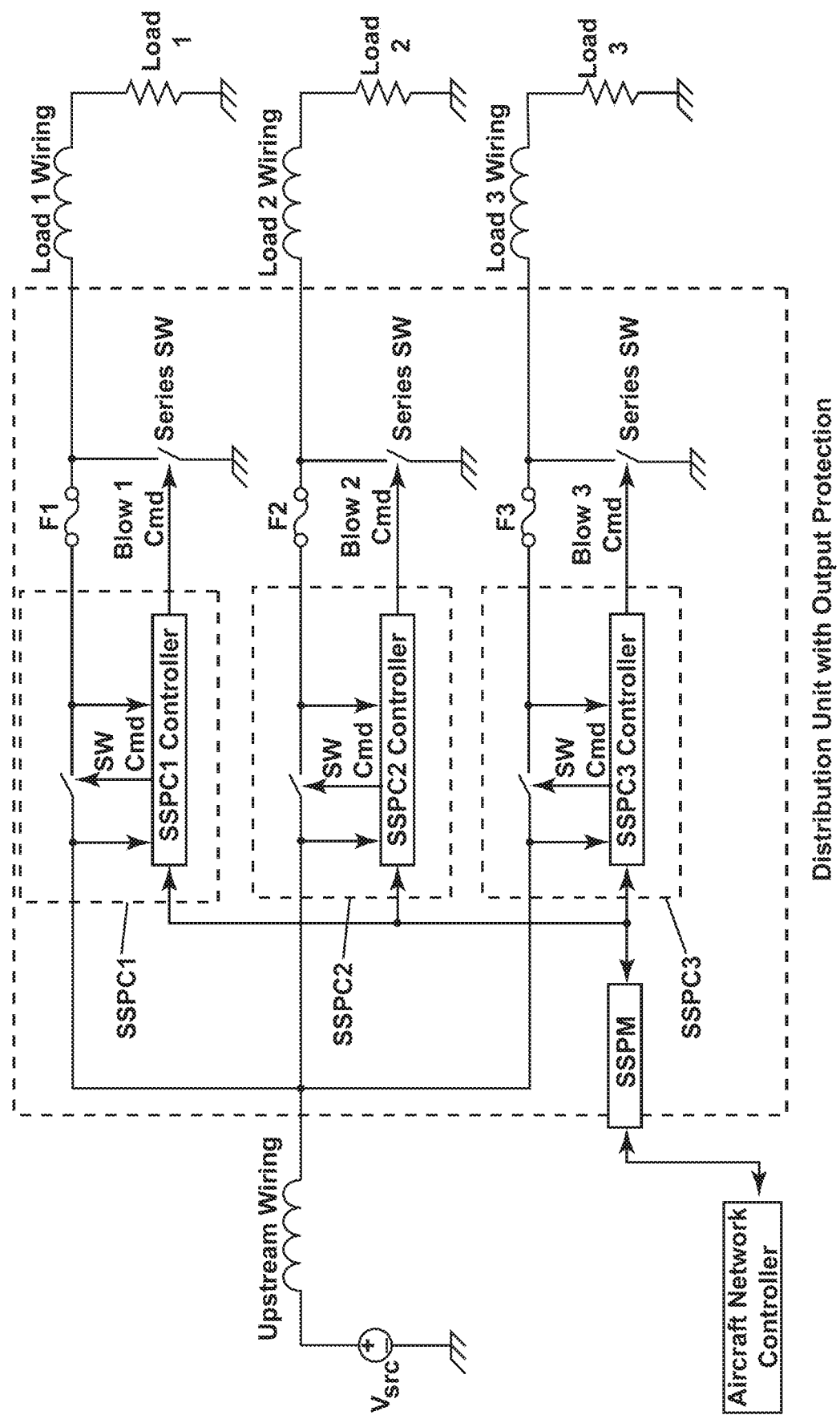
FIG. 2 illustrates a prior art solution providing a secondary protection to the load wiring of FIG. 1.

In the prior art solution of FIG. 2, an output fuse (F1, F2, F3) can be placed in series with an output of the SSPC with a switch across the load wiring as shown. The control circuit can be configured to close the relay when a failure is detected and thereby blow the hard fuse to provide a secondary power cut to the load and the load wiring.

However, activating the output fuse cannot protect the SSPC should the SSPC experience a catastrophic failure resulting in malfunction, overheating, or arcing. Additionally, a trip protection limit of the SSPC may prevent the fuse from receiving enough current to melt a physical element of the output fuse in the event the relay is closed, leaving the load wiring without an effective secondary protection system. Also, the solid state switch can fail with a moderate impedance such as to restrict fuse current to lie below a current-time blow characteristic of the output fuse such that the fuse cannot be blown.

As may be appreciated, there exists a need in the art for a secondary protection for the load wiring in the event of a failure in the SSPC or an overcurrent event in the load wiring. Additionally, there exists a need in the art to also protect the SSPC and the distribution unit from catastrophic failure, most notably, where damage, overheating, or arcing occurs within a solid state switch device of the SSPC. Also, there exists a need in the art for a diversified, reliable, and low cost secondary protection depending on a technology dissimilar from the solid state switch.

Figure 3:
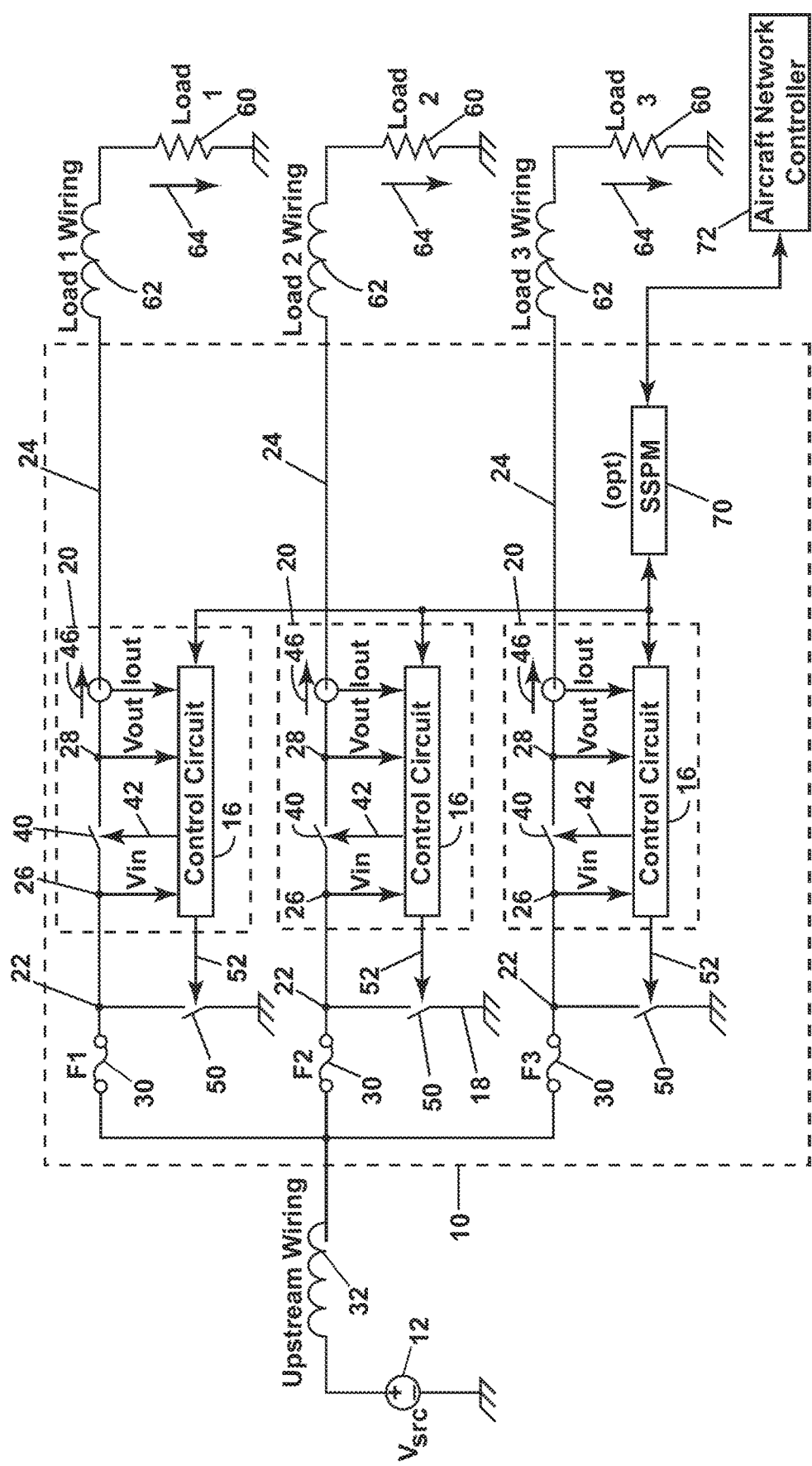
FIG. 3 illustrates a schematic of a system protecting a solid state power controller using a shunt switch, in accordance with various aspects described herein.

Referring now to FIG. 3, in various aspects of the present disclosure, a solid state electrical power distribution unit 10 can be configured to distribute electricity from a source 12 to a load 60 and can contain at least one solid state power controller (SSPC) 20. In this example, the distribution unit 10 can contain three SSPCs 20 which can be stacked in a frame or rack (not shown); but any number of SSPCs can be contained in distribution unit 10. The SSPCs 20 in a distribution unit 10 can be centrally controlled through an aircraft network controller 72 and optional solid state power manager (SSPM) 70. The SSPC 20 can have an input 22 coupled to the source 12 through an upstream wiring 32 and an output 24 coupled to the load 60 through a load wiring 62. Each SSPC 20 can have an independent load 60. A voltage of the source 12 can be a wide range of DC or AC voltages including, but not limited to, 28 VDC, 115 VAC, and 270 VDC.

A normally-open shunt switch 50 can be connected between the input 22 and a ground 18. The shunt switch 50 can comprise, but is not limited to, a solid state switch or a relay. A fuse 30 can be connected between the source 12 and the input 22 of one or more SSPCs 20. Each SSPC 20 can have an independent fuse 30. Each fuse 30 can be a hard fuse that physically breaks to an open circuit when heated, such as a wire or element that melts under high current flow. The fuse 30 can alternately be a semiconductor that increases in impedance when a high current flows, or a resettable fuse dissimilar from solid state switch technology so as to provide independent protection for load wiring 62.

A control circuit 16 in the SSPC 20 can be coupled to the shunt switch 50 through a blow command line 52, wherein upon detecting a failure in the SSPC 20, the control circuit 16 can close the shunt switch 50 through the blow command line 52 to cause a short circuit that will blow the fuse 30 and isolate the SSPC 20 from the source 12. The control circuit 16 can also be coupled to a series switch 40 through a power control line 42, where the series switch 40 can be configured to switch input 22 to output 24. The series switch 40 can be a MOSFET or other solid state device for switching the input 22 to the output 24. The control circuit 16 can also be partly or wholly external to the SSPC 20 and can be shared between two or more SSPCs 20.

Referring still to FIG. 3, the control circuit 16 can be configured to detect a failure in the SSPC 20 through the measurement of various operating parameters of the SSPC 20. For example, the control circuit 16 can monitor an input voltage 26 of the SSPC, an output voltage 28 of the SSPC, and a switch current 46 through the series switch 40 for the purpose of testing the operating parameters of the SSPC 20 against one or more failure thresholds in an ON or OFF state of the series switch 40. The monitoring of the various operating parameters can occur continuously, which can include monitoring the parameters periodically. When a catastrophic failure is detected by the control circuit 16, a blow command line 52 can close the shunt switch 50 and force the fuse 30 to blow, thereby galvanically isolating the SSPC 20 from the source 12. The control circuit 16 can also respond to remote control commands through the network controller 72 or the SSPM 70 for commanding the series switch 40 to be open (OFF) or closed (ON), thus allowing automatic or manual control of load current 64 through the load 60.

When the series switch 40 is commanded to be open (OFF), the control circuit 16 can detect a failure as a switch voltage falling below an OFF-threshold ($V_{off}$ in FIG. 6) such as the input voltage 26 of the input 22, where the switch voltage can be a difference between the input voltage 26 and the output voltage 28. For example, a failure can include wire bonds being damaged in the series switch 40. The input 22 can be less than ideally isolated from the output 24 in a failed condition of switch 40 such that the output voltage rises up from zero or the input voltage 26 drops from its nominal non-failed value due to excessive loading by the failed SSPC 20.

Another catastrophic failure can be detected by the control circuit 16 as the switch current 46 rises above an OFF-threshold ($I_{off}$ in FIG. 6), such as rising above zero (e.g. zero milliamperes), when the series switch 40 is commanded to be open. In an alternate aspect, $I_{off}$ can be a failure threshold equal to a small non-zero leakage current normally occurring between the input 22 and the output 24 of the SSPC 20 during healthy operation.

Continuing with FIG. 3, a further catastrophic failure can be detected as the switch voltage exceeds an ON-threshold ($V_{on}$ in FIG. 6) of the SSPC 20 when the series switch 40 is commanded to be closed (ON). For example, the ON-threshold for the switch voltage can be slightly above a normal ON-state voltage drop of the series switch 40 conducting switch current 46. Additional parameters can be utilized by the control circuit 16 to trigger the fuse 30 to blow, including but not limited to, a measurement of the temperature of the series switch 40, a measure of the occurrence of arcing, or a measurement of fluctuation or noise in the output voltage 28. Each control circuit 16 of a particular SSPC 20 can collect data on the operating parameters of other SSPCs 20 in order to sense stress building up which may threaten the particular SSPC, and the failure threshold of the particular SSPC can be dynamically adjusted to better anticipate a failure.

Beneficially, the protection system of the present invention can galvanically isolate one or more SSPCs 20 from the source 12 and thereby quench an arcing process occurring between and the SSPC input 22 and the output 24, or occurring between the input 22 and the chassis (ground) 18. Blowing the fuse 30 can thus prevent overheating or fire in the SSPC 20 or in the distribution unit 10 housing the SSPCs 20, whereas the prior art's breaking a path between the output 24 and the load wiring 62 cannot generally quench the arcing. Furthermore, the protection system can protect the load wiring 62 when the SSPC 20 is disabled by cutting power to the load wiring 62 and the SSPC 20, which can prevent an electrical fire in an aircraft or a ground-based power distribution system.

Continuing with FIG. 3, in various aspects of the present disclosure, the fuse 30 can have a current-time blow characteristic 36 (FIG. 5) chosen to be above a trip protection curve 29 (FIG. 5) of the SSPC 20 providing over-current protection for the load 60 or load wiring 62. The trip protection limit of the SSPC 20 can be set above a nominal operating point for the load current 64 such that the SSPC 20 remains closed (ON) as long as the load current 64 is flowing at a safe and normal level. When the load current 64 exceeds the trip protection limit, the SSPC can open the series switch 40 to cut power to the load wiring 62 before the load current 64 reaches a smoke limit curve 66 of the load wiring 62. The SSPC 20 can then be manually or automatically reset to a closed position (ON) once the overcurrent event has passed, allowing a resumed operation of the SSPC without repair. By positioning the current-time blow characteristic 36 of the fuse 30 to be above the trip protection curve 29, the fuse 30 remains intact when there is not a catastrophic failure of SSPC 20.

The trip protection curve 29 can follow an $I^2t$ (or similar current-time) wire protection function common in an electromechanical circuit breaker, where the curve follows an $I^2R$ (current squared) resistive heating characteristic of a conductor. Alternately, the trip protection curve 29 can follow a linear current-time function, or follow a step function controlled by the control circuit instead of being a continuous curve. The trip protection curve 29 can be programmed to be parallel to and slightly below a fuse characteristic 36 that has been characterized in order to effect maximum operating margin for load 60 and load wiring 62.

Figure 5:
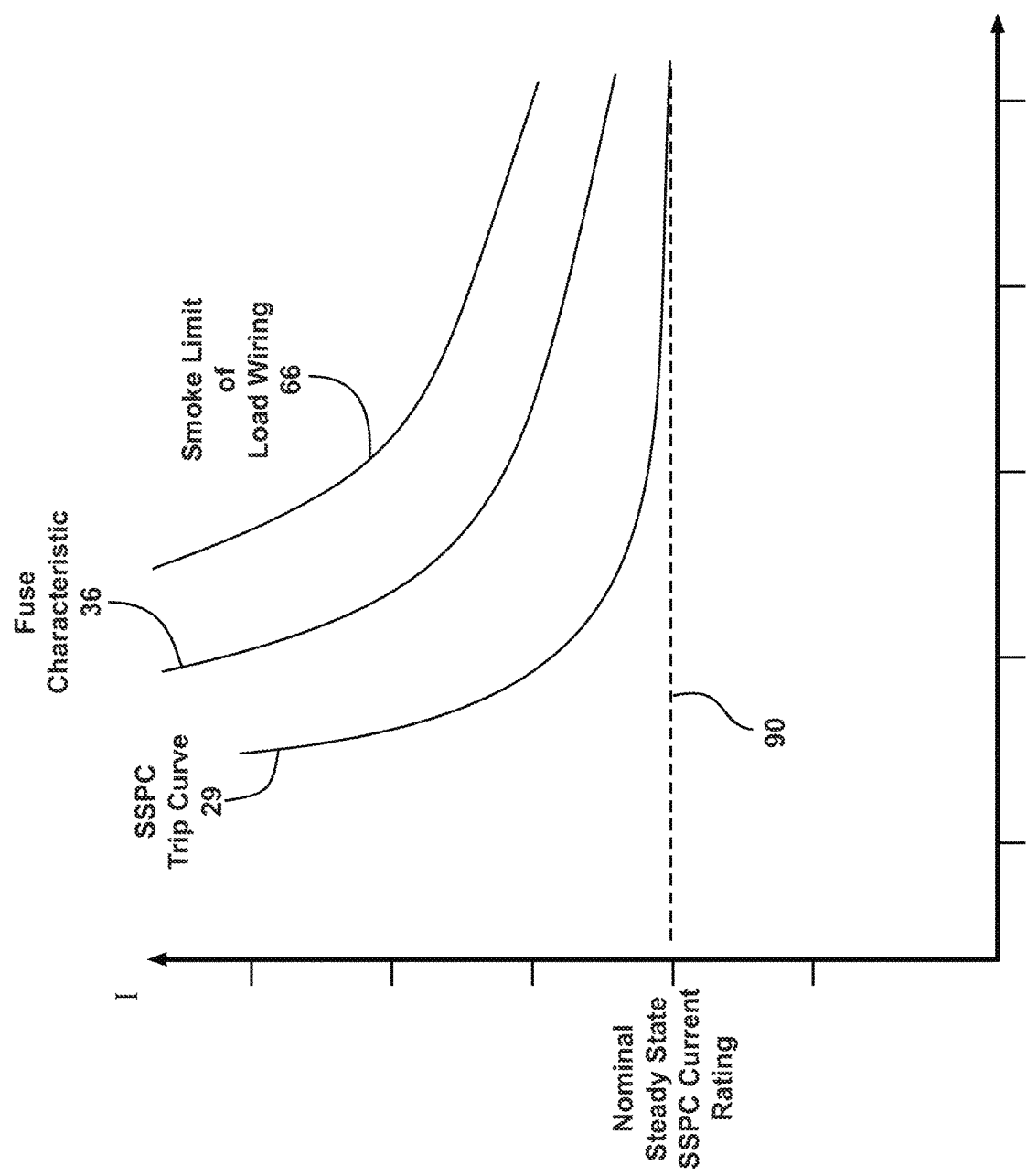
FIG. 5 illustrates a plot of a current-time characteristic of a fuse of FIGS. 3 and 4, in accordance with various aspects described herein.

As seen in FIG. 5, the smoke limit curve 66 of the load wiring can be defined as a maximum current-time operating point above which electrical insulation of the load wiring 62 begins to melt or smolder, and can be positioned above the trip protection curve 29 of the SSPC to receive adequate protection for the load wiring 62 or the load 60, particularly during an overcurrent event in the load wiring 62. The smoke limit curve 66 can also be a load wiring damage curve defined as a maximum allowable temperature of the load wiring 62, and can be positioned above the trip protection curve 29 of the SSPC 20. Operating below the load wiring damage curve can protect the load wiring 62 or prevent an operating point where damage may occur to the load 60, to the load wiring 62, or to components connected to the load wiring 62.

The fuse 30 can have a current-time blow characteristic 36 chosen to be below the smoke limit curve 66 of the load wiring 62 so that, when the SSPC has failed, and the control circuit 16 can blow fuse 30 through the blow command line 52 prior to damage occurring to the load wiring 62. The smoke limit curve 66 for wiring downstream of the SSPC 20 can be positioned above the SSPC trip curve 29 with enough margin so that a fuse current-time blow characteristic 36 can be positioned between curves 29 and 66 (FIG. 5). In one aspect, a current-carrying capacity of the load wiring 62 can be increased, such as by increasing a wire diameter of the load wiring 62, in order to position the smoke limit curve 66 above the fuse characteristic 36.

Additionally, the source 12 can be configured to supply a current level greater than the fuse characteristic 36 for a range of expected blow times so that the fuse 30 reliably blows when commanded by the blow command line 52. Also, the trip protection curve 29 of the SSPC 20 can be programmed by the control circuit 16 to lie below the current-time blow characteristic 36 of the fuse 30 so that the SSPC 20 can provide a resettable overcurrent protection for the load wiring 62 and avoid blowing the fuse 30 when there is no catastrophic failure.

Figure 4:
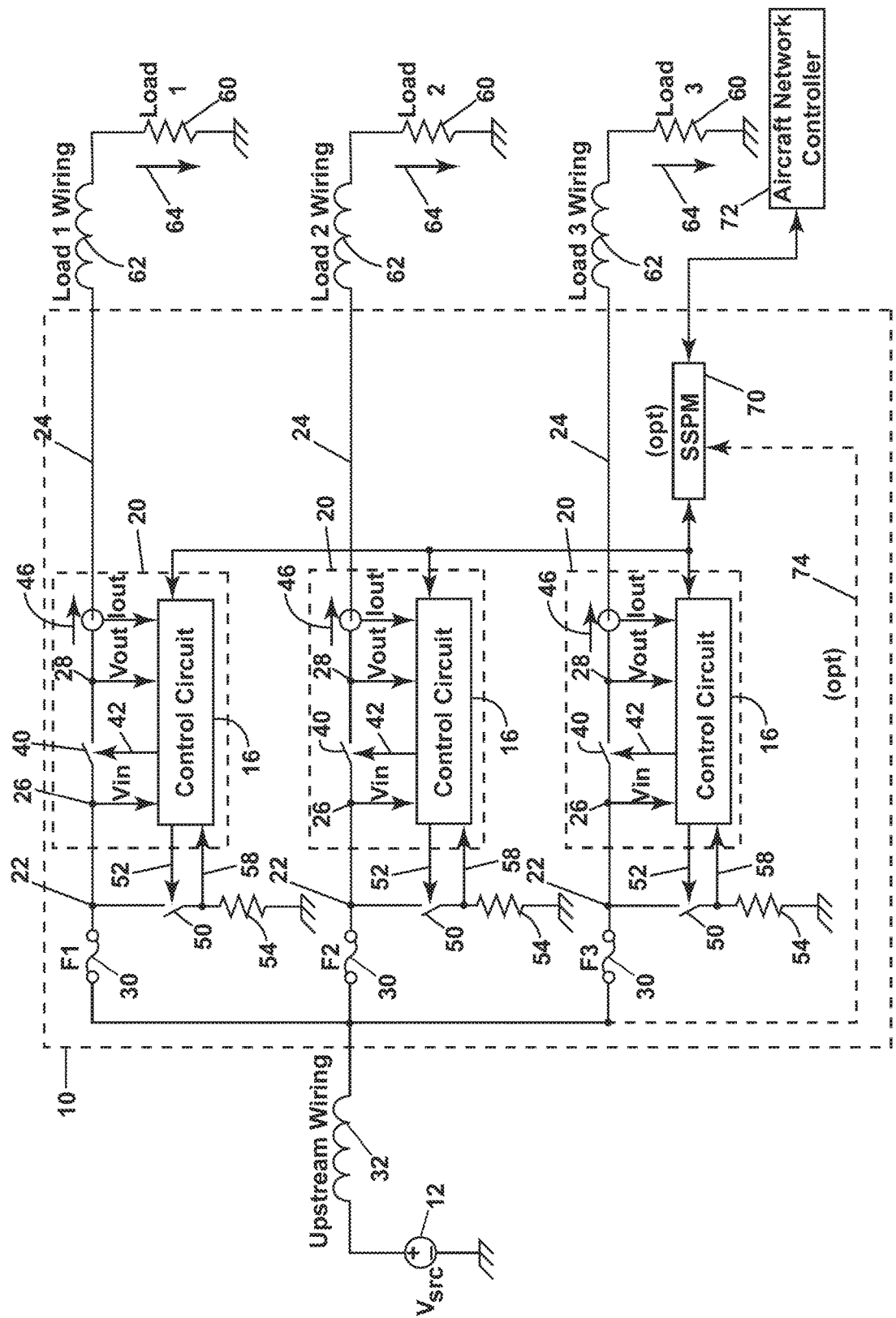
FIG. 4 illustrates a schematic of the protection system of FIG. 3 with a monitoring resistor, in accordance with various aspects described herein.

Referring now to FIG. 4, in various aspects, the distribution unit 10 can further include a current sense resistance 54 in series with the shunt switch 50 and can be monitored by the control circuit 16 through a shunt sense line 58 during a momentary closure of the shunt switch 50. The current sense resistance 54 can be a separate resistor in series with the shunt switch 50, or can be an internal resistance of the shunt switch 50. The blow command line 52 can close the shunt switch 50 momentarily in order to draw a current through fuse 30 without blowing the fuse 30. By developing a voltage at the shunt sense line 58, it can be verified that the fuse has not been blown and the shunt switch 50 is available for actuation should the SSPC 20 fail. In this way, the current sense resistance 54 can provide an auto-test function for the secondary protection system of the present disclosure.

The current sense resistance 54 can be located on a high or a low voltage side of the shunt switch 50. The size of the resistance 54 can be set small enough to not extend a blow time of the fuse 30 should a catastrophic failure occur. Yet, the resistance 54 can be set large enough to acquire an easily detectable voltage rise when the shunt switch 50 is momentarily closed for testing that the protection system is intact. Additionally, in an embodiment not shown, a source sense line 74 can connect the source 12 to the solid state power manager (SSPM) 70 in order to sense the presence or non-presence of a source voltage and distinguish its absence from a blown fuse 30. The source sense line 74 can also be measured by the control circuit 16 or by the aircraft network controller 72.

Referring now again to FIG. 5, in an aspect of the disclosure, a plot of current on the Y-axis versus time on the X-axis shows a relationship between the current-time characteristics of the SSPC trip protection curve 29, the fuse characteristic 36, and the smoke limit 66 of the load wiring. As the load current increases beyond a nominal steady-state SSPC current rating 90, the length of time it takes for the SSPC to trip can gradually decrease. Beneficially, positioning the fuse characteristic 36 of the disclosed protection system between the SSPC trip curve 29 and the smoke limit curve 66 allows the improved distribution unit 10 to provide secondary protection of the load wiring in the event of an SSPC failure without impeding the overcurrent protection function of the SSPC 20. The protection system can be integrated into a distribution unit 10 or can be an external module adapted to interface with the input 22, the output 24, and the control circuit 16 of the SSPC 20.

Figure 6:
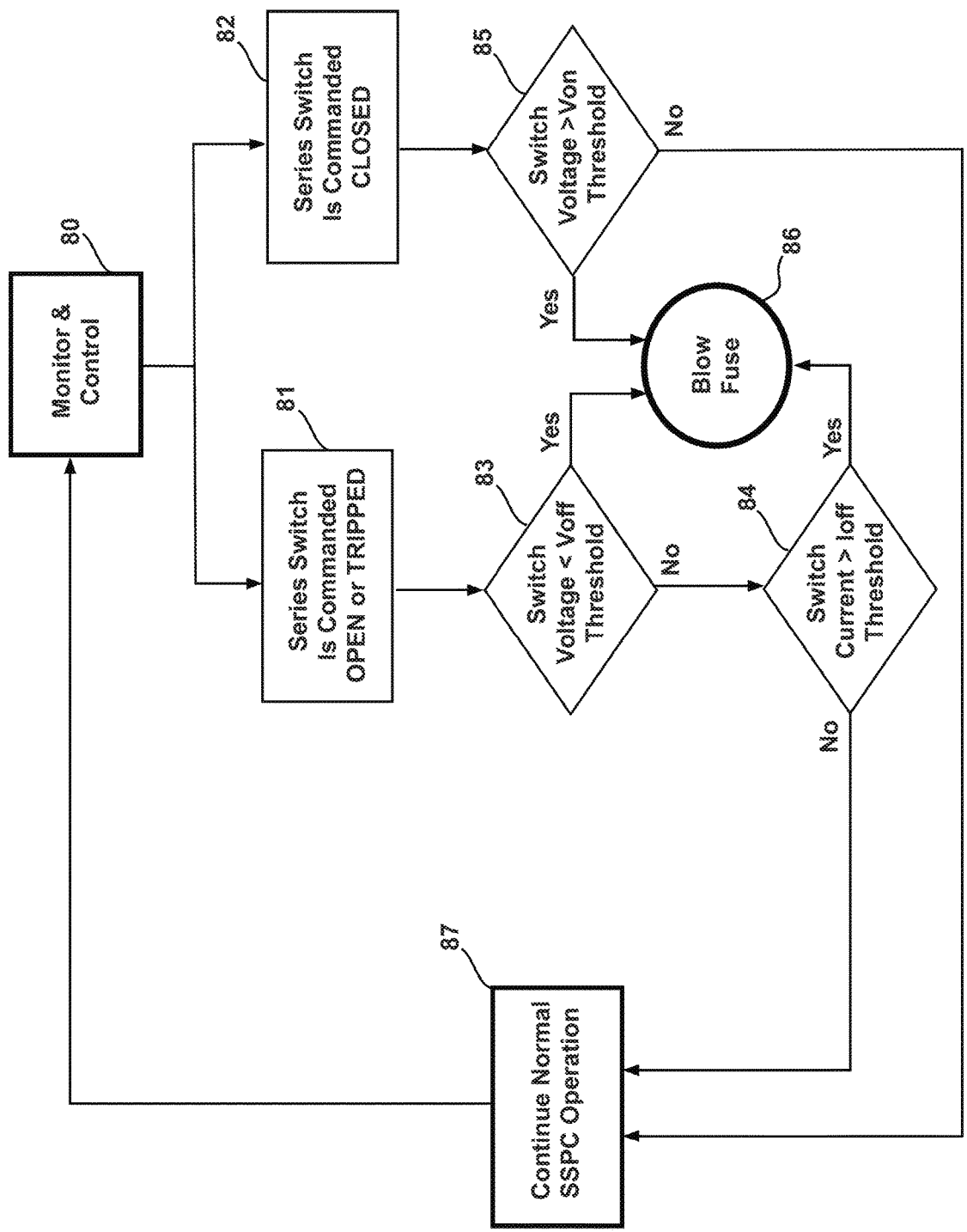
FIG. 6 illustrates a protection logic of FIGS. 3 and 4, in accordance with various aspects described herein.

Referring now to FIG. 6, in an aspect of the disclosure, a protection logic of the improved distribution unit 10 is presented. Monitor and control step 80 can be performed by the control circuit 16, the SSPM 70, or by an external circuit monitoring one or more operating parameters, including operating parameters of the SSPC such as the input voltage, the output voltage, and the switch current. For example, the control circuit 16 can command the SSPC to be open (step 81) or closed (step 82). The operating parameters can be monitored continuously or periodically for detecting a catastrophic failure warranting the blowing of fuse 30 (step 86), such as monitoring the switch voltage (steps 83 and 85) or monitoring the switch current (step 84). In the event the failure threshold has been exceeded (YES), the shunt switch 50 can be closed to cause the fuse 30 to blow and open the circuit between source 12 and the input 22. If there is no failure (NO), normal operation can continue (step 87), as can the monitoring step 80.

In other aspects not shown, the distribution unit 10 can contain a power converter or a voltage converter to convert a source voltage to an output voltage different than the source voltage, such as converting 270 VDC to 28 VDC, where the series switch 40 can be positioned to switch the source voltage or the output voltage.

Many other possible embodiments and configurations in addition to those shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A solid state electrical power distribution system for distributing electricity from a source to a load, the system comprising:
   at least one solid state power controller (SSPC) having an input coupled to the source and an output coupled to the load;
   an open shunt switch in the SSPC connecting the input to ground; a control circuit coupled to the shunt switch and configured to detect a failure in the SSPC, wherein the failure comprises a switch of the SSPC failing in a closed or partially closed state;
   a current sense resistance in series with the shunt switch and monitored by the control circuit during a momentary closure of the shunt switch; and
   a fuse connected between the source and the input;
   wherein upon detecting a failure in the SSPC, the control circuit closes the shunt switch to cause a short circuit that will blow the fuse and isolate the SSPC from the source.

2. The power distribution system of claim 1 wherein the SSPC utilizes a solid state switch connecting the input to the output and coupled to the control circuit.

3. The power distribution system of claim 2 wherein when the solid state switch is commanded to be open the failure is one of a switch voltage between the input and the output being less than an input voltage of the input or a switch current between the input and the output being greater than zero.

4. The power distribution system of claim 1 wherein the fuse has a current-time blow characteristic chosen to be above a trip protection curve of the SSPC providing over-current protection for the load.

5. The power distribution system of claim 1 wherein the fuse has a current-time blow characteristic chosen to be below a smoke or damage limit curve of the load.

6. The power distribution system of claim 1 further including multiple SSPCs each having an independent load and an independent fuse.

7. A method of galvanically isolating an input of at least one solid state power controller (SSPC) from a source in the event of a failure in a solid state electrical power distribution system distributing electricity from the source to a load of the SSPC, the method comprising:
   providing an open shunt switch in the SSPC connecting the input to ground;
   momentarily closing the shunt switch and sensing a voltage across a current sense resistance in series with the shunt switch for monitoring the shunt switch;
   continuously checking the SSPC for a failure; and
   closing the shunt switch causing a short circuit and blowing a fuse connecting the source to the input when a failure is detected, wherein the failure comprises the SSPC failing in a closed or partially closed state.

8. The method of claim 7 further comprising the SSPC utilizing a solid state switch to connect the input to the load and coupling the solid state switch to a control circuit controlling the shunt switch.

9. The method of claim 8 wherein when the solid state switch is commanded to be open the failure is one of a switch voltage between the input and the load being less than an input voltage of the input or a switch current between the load and the input being greater than zero.

10. The method of claim 7 further comprising positioning a current-time blow characteristic of the fuse above a trip protection curve of the SSPC providing over-current protection of the load.

11. The method of claim 7 further comprising positioning a current-time blow characteristic of the fuse below a smoke limit curve of the load.

12. The method of claim 7 wherein momentarily closing the shunt switch further includes momentarily closing the shunt switch for testing the shunt switch.

13. A protection system for at least one solid state power controller (SSPC) having an input adapted to couple to a source of electricity and having an output adapted to couple to a load, the protection system comprising:
   an open shunt switch connecting the input to ground;
   a control circuit coupled to the shunt switch and configured to detect a failure in the SSPC;
   a current sense resistance in series with the shunt switch and monitored by the control circuit during a momentary closure of the shunt switch; and
   a fuse connected between the source and the input;
   wherein upon detecting a failure in the SSPC, the control circuit closes the shunt switch to cause a short circuit that will blow the fuse and isolate the SSPC from the source, wherein the failure comprises a switch of the SSPC failing in a closed or partially closed state.

14. The protection system of claim 13 wherein the SSPC utilizes a solid state switch connecting the input to the output and coupled to the control circuit.

15. The protection system of claim 14 wherein when the solid state switch is commanded to be open the failure is one of a switch voltage between the input and the output being less than an input voltage of the input or a switch current between the output and the input being greater than zero.

16. The protection system of claim 13 wherein the fuse has a current-time blow characteristic chosen to be above a trip protection curve of the SSPC providing over-current protection of the load.

17. The protection system of claim 13 wherein the fuse has a current-time blow characteristic chosen to be below a smoke limit curve of the load.

18. The protection system of claim 13 wherein the fuse is one of a hard fuse or a resettable fuse having a technology dissimilar from that of a series switch of the SSPC switching the input to the output.

* * * * *